US012808992B2

(12) United States Patent
Tsuchiya et al.

(10) Patent No.: US 12,808,992 B2
(45) Date of Patent: Nov. 24, 2026

(54) ELECTROMAGNETIC WAVE TRANSMISSIVE COVER AND SENSOR MODULE

(71) Applicant: TOYODA GOSEI CO., LTD., Kiyosu (JP)

(72) Inventors: Yosuke Tsuchiya, Kiyosu (JP); Koji Fukagawa, Kiyosu (JP); Risa Hirano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 655 days.

(21) Appl. No.: 18/361,278

(22) Filed: Jul. 28, 2023

(65) Prior Publication Data

US 2024/0053441 A1 Feb. 15, 2024

(30) Foreign Application Priority Data

Aug. 12, 2022 (JP) ................................ 2022-129040

(51) Int. Cl.
*G01S 7/481* (2006.01)

(52) U.S. Cl.
CPC .................................. *G01S 7/4813* (2013.01)

(58) Field of Classification Search
CPC ............................... G01S 7/027; G01S 7/4813
See application file for complete search history.

(56) References Cited

U.S. PATENT DOCUMENTS 5,438,333 A * 8/1995 Perkins ................ H01Q 17/001 342/4
11,353,575 B1 * 6/2022 Robertson ............. G01S 13/872
2020/0096612 A1 3/2020 Otoyo et al.
2022/0137229 A1 5/2022 Hirose et al.

FOREIGN PATENT DOCUMENTS

JP 2004-020514 A 1/2004
JP 6225380 B2 11/2017
JP 2020-051778 A 4/2020
JP 2020-079053 A 5/2020
JP 2021-136540 A 9/2021

OTHER PUBLICATIONS

Office Action dated Jul. 22, 2025 in counterpart Japanese Patent Application No. 2022-129040 (and English machine translation).

* cited by examiner

*Primary Examiner* — Christopher D Hutchens
(74) *Attorney, Agent, or Firm* — Posz Law Group, PLC

(57) ABSTRACT

An electromagnetic wave transmissive cover is configured to be employed in a vehicle to which a sensor device including an electromagnetic wave transmissive portion is attached. The electromagnetic wave transmissive cover includes a cover body that covers the sensor device from the front in the emission direction of electromagnetic waves, and a seal member that is attached to the cover body. The seal member is configured to be disposed between the sensor device and the cover body. The seal member includes a foam seal portion that is formed by foaming an elastic material. The foam seal portion is configured to be in contact with the sensor device in a state of surrounding the electromagnetic wave transmissive portion.

8 Claims, 10 Drawing Sheets

ELECTROMAGNETIC WAVE TRANSMISSIVE COVER AND SENSOR MODULE

BACKGROUND

1. Field

The present disclosure relates to an electromagnetic wave transmissive cover that covers a sensor device from the front in an emission direction of electromagnetic waves, and a sensor module including the sensor device and the electromagnetic wave transmissive cover.

2. Description of Related Art

For example, Japanese Laid-Open Patent Publication No. 2020-79053 discloses a sensor module including a sensor device and an electromagnetic wave transmissive cover.

The sensor device is attached to a vehicle and emits electromagnetic waves such as near-infrared rays toward the outside of the vehicle. The sensor device receives electromagnetic waves reflected by an object outside the vehicle. Based on the emitted and received electromagnetic waves, the sensor device, for example, recognizes an object outside the vehicle, detects a distance between the vehicle and the object, and detects a relative velocity between the vehicle and the object. The outer shape of the sensor device is formed by a case. An electromagnetic wave transmissive portion is formed at a front end portion of the case. The sensor device performs emission and reception of electromagnetic waves through the electromagnetic wave transmissive portion.

The framework of the electromagnetic wave transmissive cover includes a cover body. The cover body covers the sensor device from the front in the emission direction of electromagnetic waves.

Further, in the sensor module described in the above publication, the sensor device and the electromagnetic wave transmissive cover are separately attached to the vehicle.

However, in the sensor module disclosed in the above publication, water and debris may enter the gap between the gap between the sensor device and the cover body. When water and debris collect the electromagnetic wave transmissive portion, electromagnetic waves are absorbed by the water and debris. This can reduce the detection performance of the sensor device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic wave transmissive cover is configured to be employed in a vehicle to which a sensor device is attached. The sensor device includes an electromagnetic wave transmissive portion and is configured to emit and receive electromagnetic waves through the electromagnetic wave transmissive portion. The electromagnetic wave transmissive cover includes a cover body and a seal member. The cover body is configured to be attached to the vehicle and cover the sensor device from a front side in an emission direction of the electromagnetic waves. The seal member is attached to the cover body and is configured to be disposed between the sensor device and the cover body. The seal member includes a foam seal portion formed by foaming an elastic material. The foam seal portion is configured to be in contact with the sensor device in a state of surrounding the electromagnetic wave transmissive portion.

In another general aspect, a sensor module includes a sensor device, an electromagnetic transmissive cover, and a seal member. The sensor device is configured to be attached to a vehicle, includes an electromagnetic wave transmissive portion, and is configured to emit and receive electromagnetic waves through the electromagnetic wave transmissive portion. Thee electromagnetic transmissive cover is configured to be attached to the vehicle and includes a cover body. The cover body covers the sensor device from a front side in an emission direction of the electromagnetic waves. The seal member is disposed between the sensor device and the cover body. One of the cover body and the sensor device serves as an attachment object to which the seal member is attached, and the other one of the cover body and the sensor device serves as a contact object with which the seal member is in contact. The seal member is attached to the attachment object. The seal member includes a foam seal portion that is formed by foaming an elastic material and is in contact with the contact object in a state of surrounding the electromagnetic wave transmissive portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

First Embodiment

A sensor module 20 for a land vehicle 10 according to a first embodiment will now be described with reference to FIGS. 1 to 8.

In the following description, the direction in which the land vehicle 10 advances forward will be referred to as the front, and the reverse direction will be referred to as the rear. The vertical direction refers to the vertical direction of the land vehicle 10, and the left-right direction refers to the vehicle width direction that agrees with the left-right direction when the land vehicle 10 is advancing forward.

Figure 1:
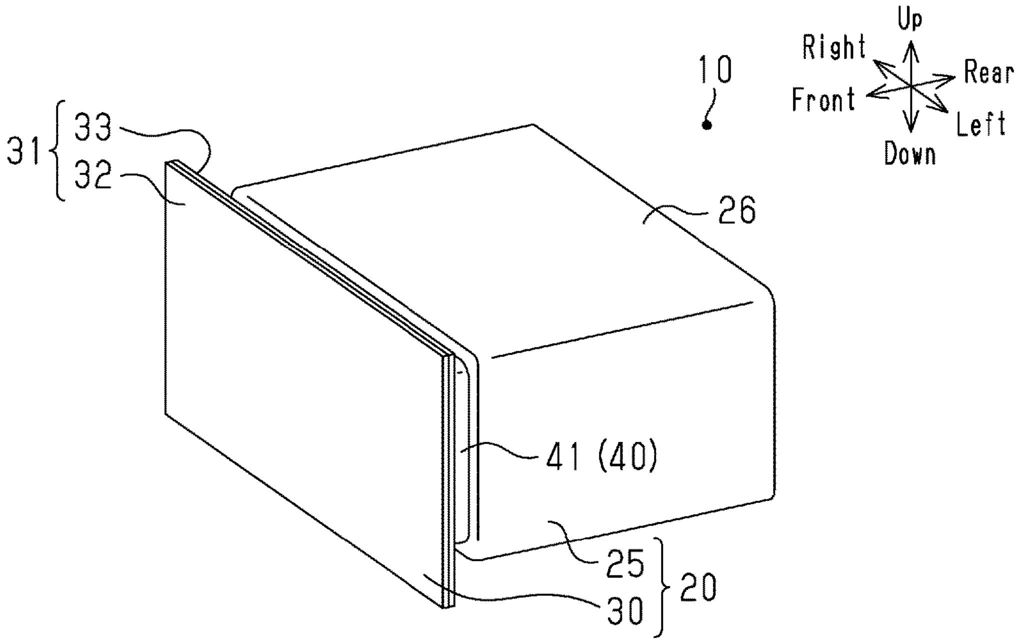
FIG. 1 is a perspective view of a sensor module according to a first embodiment.

As shown in FIG. 1, the sensor module 20 is mounted on the land vehicle 10 and includes a sensor device 25 and an electromagnetic wave transmissive cover 30. The components of the sensor module 20 will now be described.

<Sensor Device 25>

Figure 2:
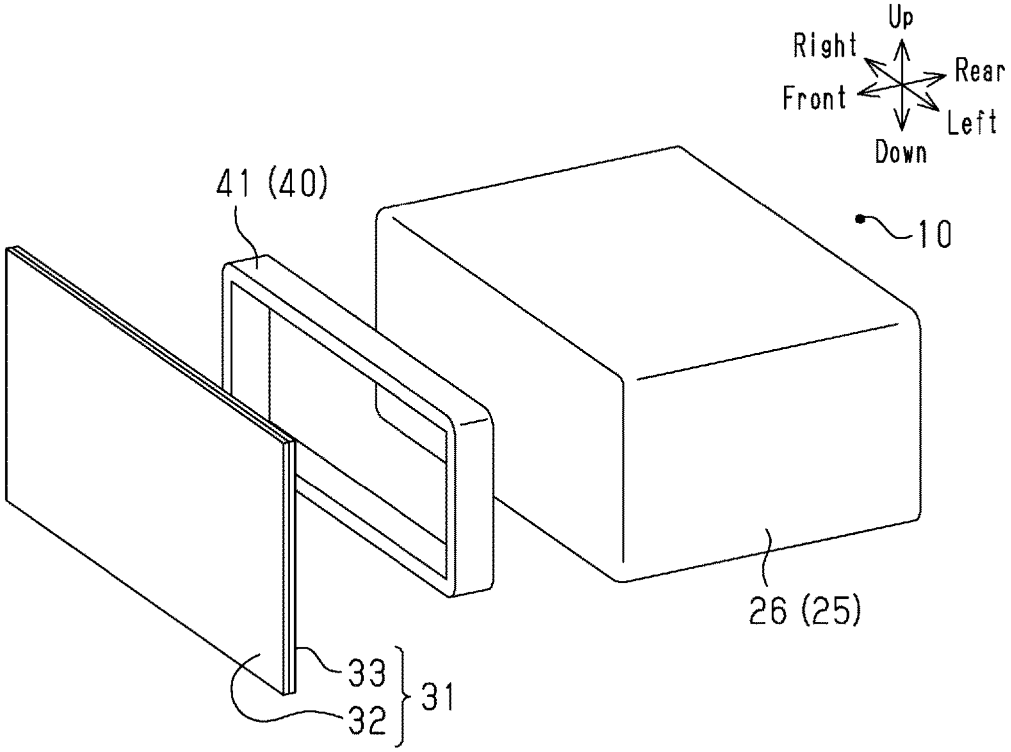
FIG. 2 is an exploded perspective view of the sensor module shown in FIG. 1.
Figure 4:
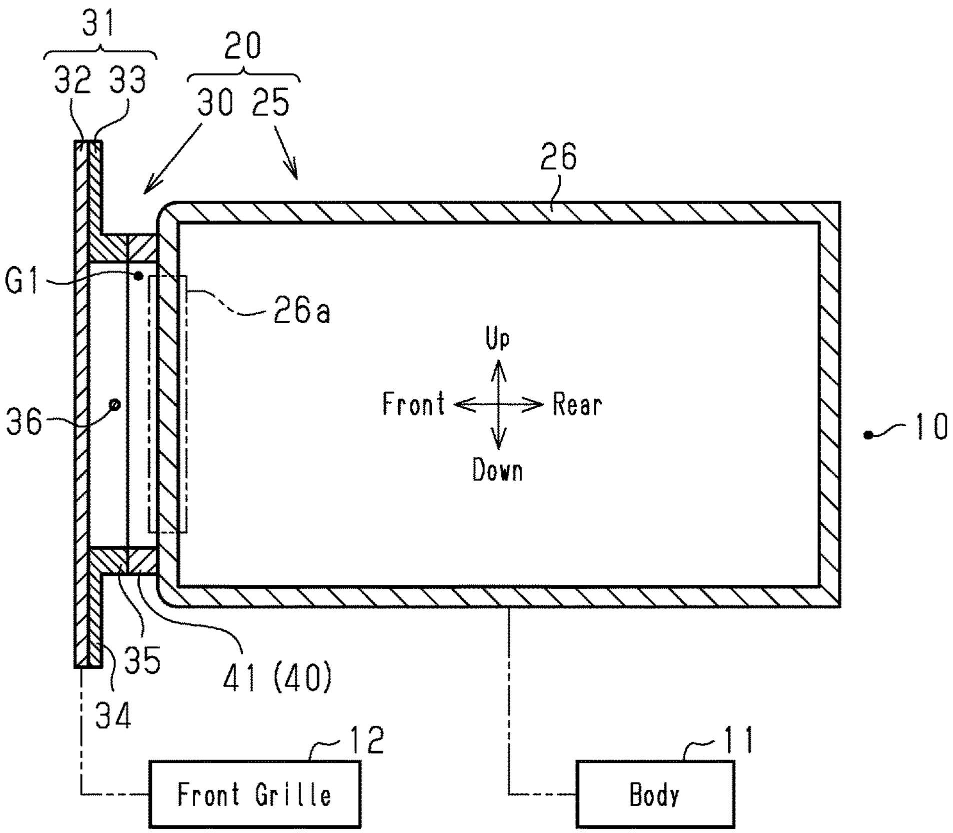
FIG. 4 is a cross-sectional side view taken along line 4-4 of FIG. 3.

As shown in FIGS. 2 and 4, a front grille 12 is disposed at a front end portion of a body 11 of the land vehicle 10. The sensor device 25 is attached to a part of the body 11 that is rearward of the front grille 12. In the first embodiment, the sensor device 25 includes a near-infrared sensor for forward monitoring. The near-infrared sensor emits electromagnetic waves, specifically, near-infrared rays having wavelengths of 700 nm to 2500 nm, to a specified angular range forward of the land vehicle 10, and receives near-infrared rays reflected by objects outside the land vehicle 10, including preceding vehicles, pedestrians, and the like. The sensor device 25 recognizes objects outside the land vehicle 10 based on the emitted and received electromagnetic waves, and detects the distance, the relative velocity, and the like between the land vehicle 10 and each object.

As described above, since the sensor device 25 emits electromagnetic waves (near-infrared rays) forward of the land vehicle 10, the emission direction of electromagnetic waves by the sensor device 25 is a direction from the rear to the front of the land vehicle 10. The front in the emission direction of the electromagnetic waves substantially agrees with the front of the land vehicle 10. The rear in the emission direction also substantially agrees with the rear of the land vehicle 10. Accordingly, in the following description, the front in the emission direction of electromagnetic waves will simply be referred to as “forward” or “front.” The rear in the emission direction will simply be referred to as “rearward” or “rear.”

As shown in FIGS. 1 and 2, the outer shape of the sensor device 25 is formed by a case 26. In the first embodiment, the case 26 has a rectangular parallelepiped shape that is longer in the front-rear direction and in the left-right direction than in the vertical direction. The case 26 incorporates an emitting unit, which emits electromagnetic waves, and a receiving unit, which receives electromagnetic waves. The illustration of the internal structure of the sensor device 25 is omitted in FIGS. 4 to 8. The same applies to FIGS. 10 and 11, which illustrate a second embodiment, and FIGS. 14 and 15, which illustrate a third embodiment. Further, the same applies to FIG. 20, which illustrates a modification.

Figure 5:
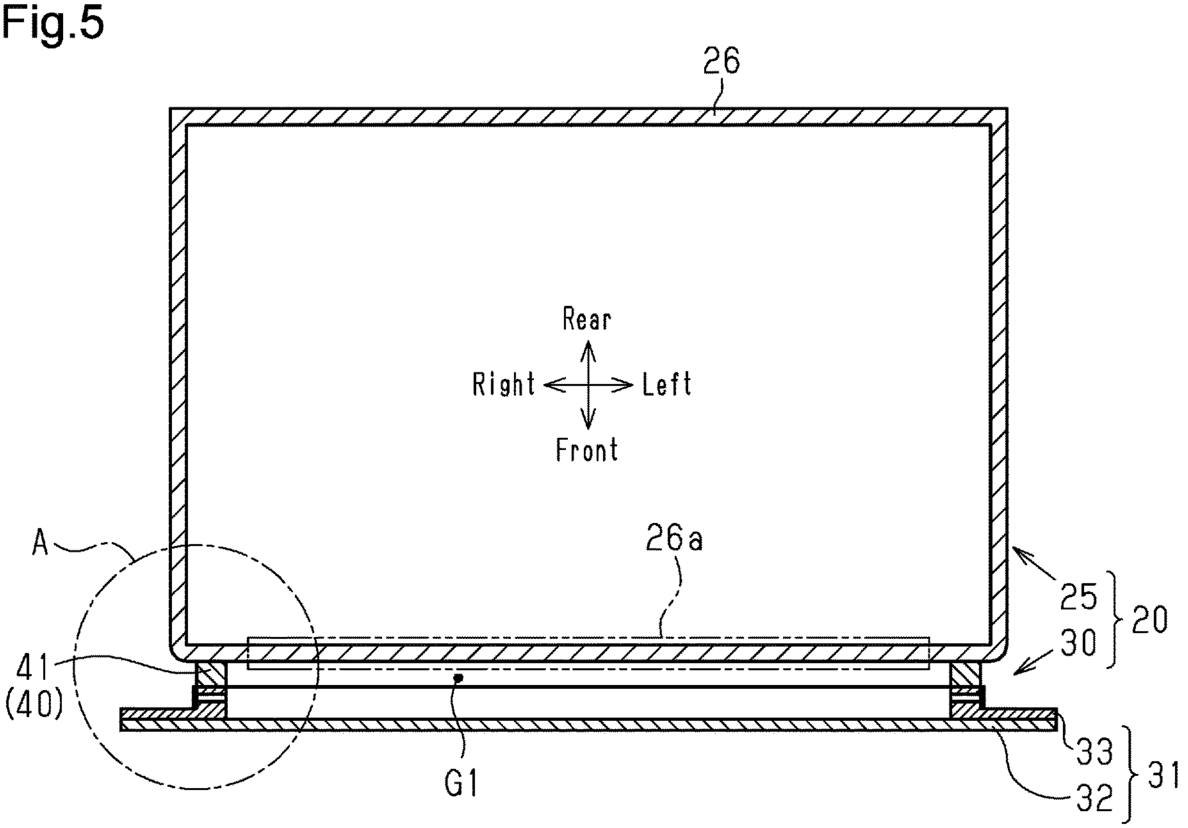
FIG. 5 is a cross-sectional plan view taken along line 5-5 of FIG. 3.
Figure 6:
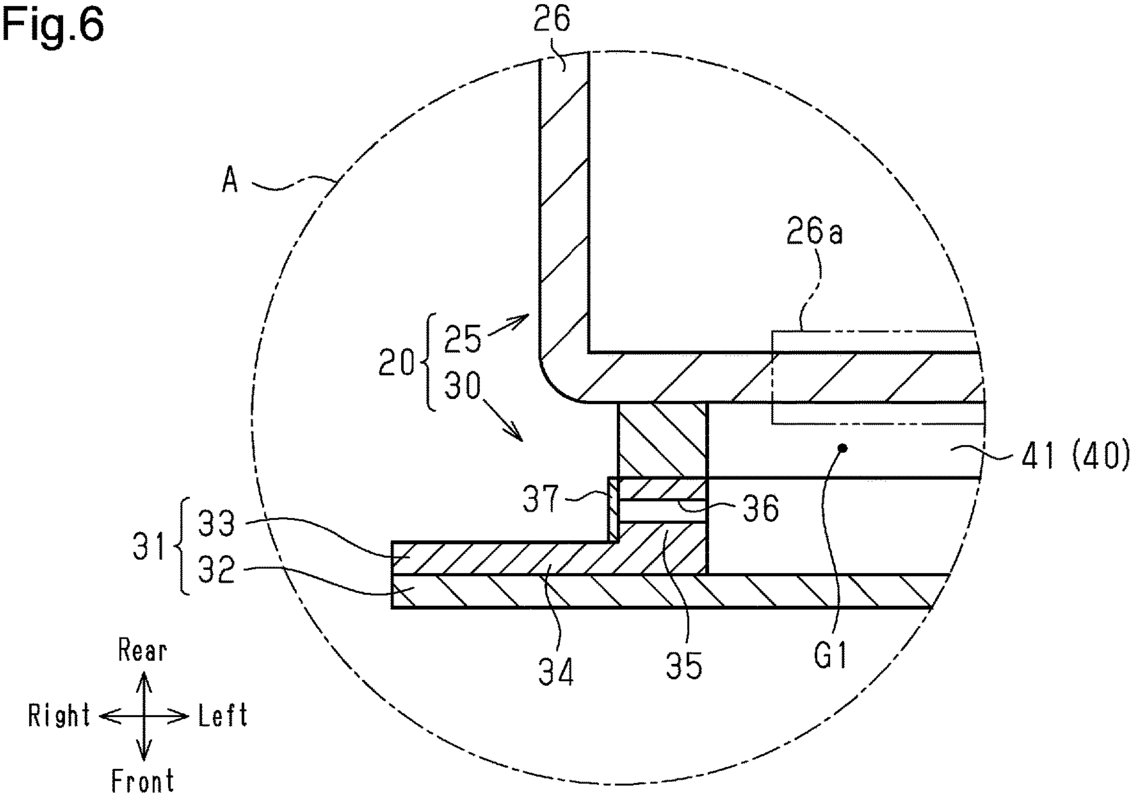
FIG. 6 is an enlarged cross-sectional plan view of section A in FIG. 5.

As indicated by the long-dash double-short-dash line in FIGS. 4 to 6, the case 26 includes an electromagnetic wave transmissive portion **26*a*, which is transmissive to electromagnetic waves (near-infrared rays) at a front end portion. The emission and reception of electromagnetic waves are performed through the electromagnetic wave transmissive portion 26*a***.

<Electromagnetic Wave Transmissive Cover 30>

Figure 3:
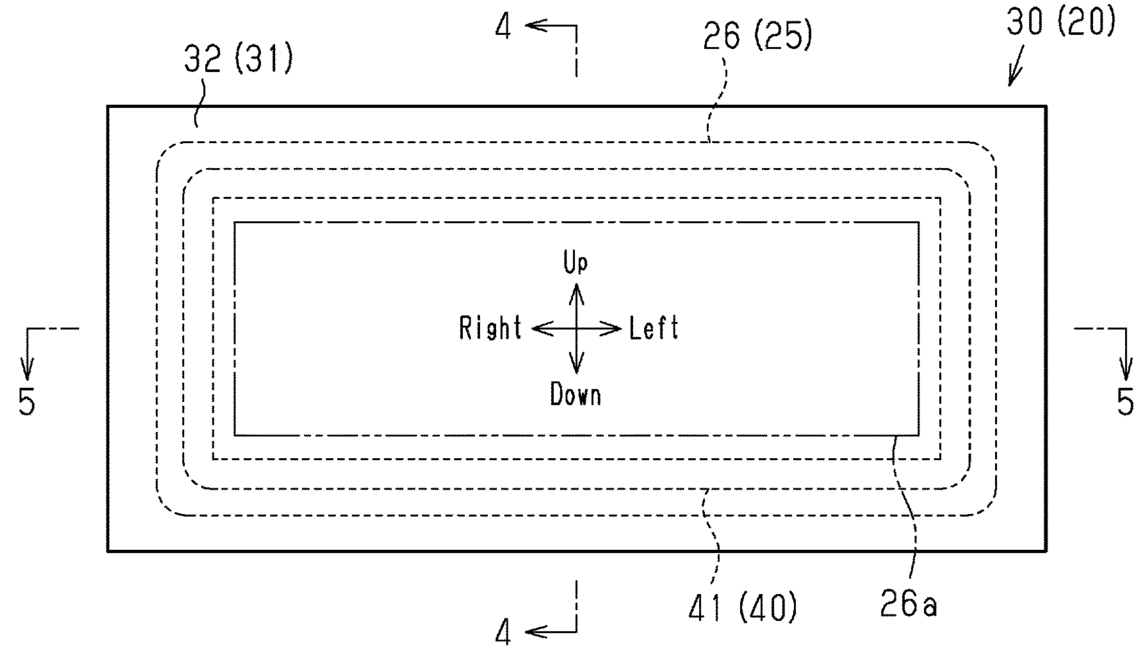
FIG. 3 is a front view of the sensor module shown in FIG. 1.

As shown in FIGS. 1 and 2, the framework of the electromagnetic wave transmissive cover 30 includes a cover body 31. The cover body 31 includes a plate-shaped portion 32 disposed forward of the sensor device 25. As shown in FIG. 3, the plate-shaped portion 32 has the shape of a rectangular plate that is longer in the left-right direction than in the vertical direction. The cover body 31, which includes the plate-shaped portion 32, covers the sensor device 25 from the front to protect the sensor device 25 from impacts and the like, and also decorates the front end portion of the land vehicle 10.

The plate-shaped portion 32 may be formed of a single layer of an electromagnetic wave transmissive material. In this case, the plate-shaped portion 32 may be made of, for example, a polycarbonate (PC) plastic. The plate-shaped portion 32 may have a layer structure in which multiple layers each being transmissive to electromagnetic waves are stacked in the front-rear direction. In this case, the layers may include a decorative layer.

The electromagnetic wave transmissive cover 30 is attached to the front grille 12 at the cover body 31 by screw fastening, a snap-fit structure, or the like (not shown).

<Sealing Structure>

As shown in FIGS. 4 to 6, the sensor module 20 is provided with a sealing structure that prevents water and debris from entering a clearance G1 between the sensor device 25 and the cover body 31. The sealing structure includes a seal member 40 that seals the clearance G1. One of the cover body 31 and the sensor device 25 serves as an attachment object to which the seal member 40 is attached directly or indirectly, and the other serves as a contact object with which the seal member 40 is in contact, In the first embodiment, the cover body 31 is the attachment object, and the sensor device 25 is the contact object.

Figure 7:
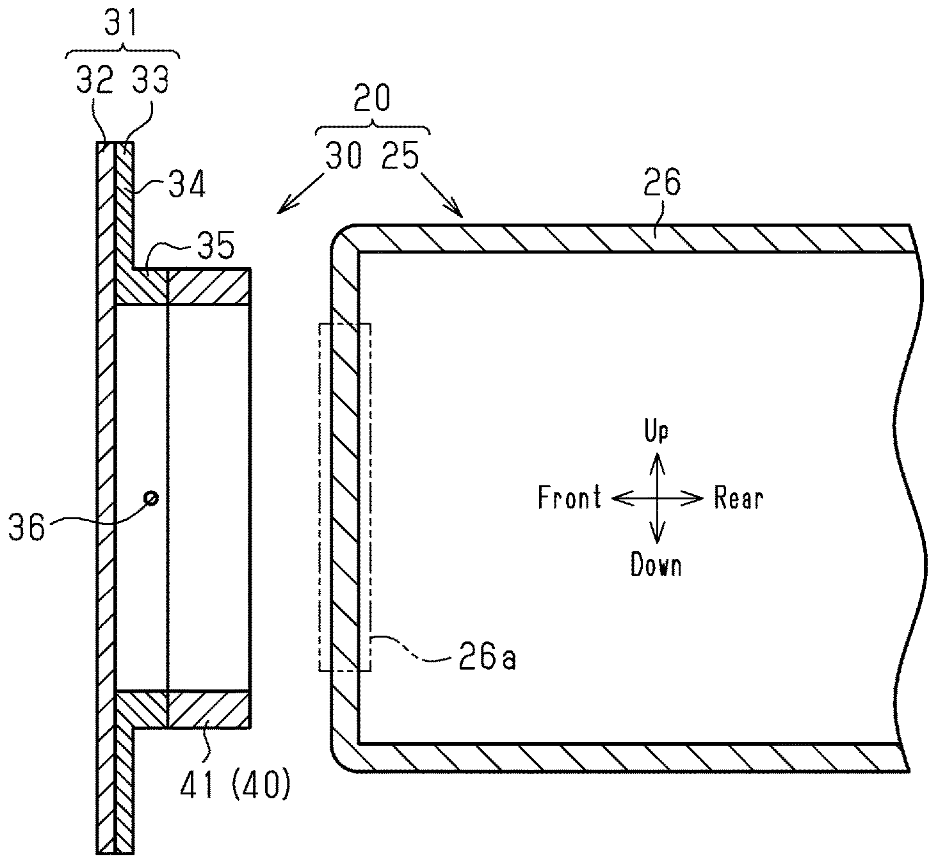
FIG. 7 is a partial cross-sectional side view corresponding to FIG. 4, illustrating an electromagnetic wave transmissive cover and a sensor device in a separated state.
Figure 8:
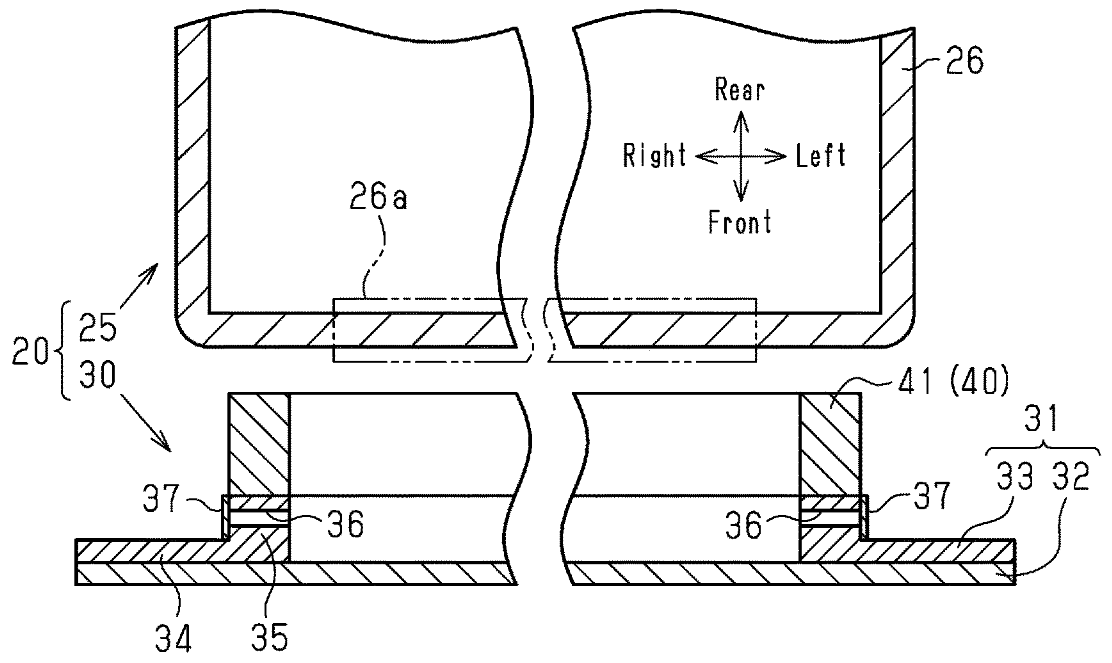
FIG. 8 is a partial cross-sectional plan view corresponding to FIG. 5, illustrating the electromagnetic wave transmissive cover and the sensor device in a separated state.

As shown in FIGS. 7 and 8, in order to attach the seal member 40 to the cover body 31, an attachment portion 33 is formed at a peripheral edge portion of the rear surface of the plate-shaped portion 32 by a plastic molding method such as a two-color molding method. The attachment portion 33 forms the cover body 31 together with the plate-shaped portion 32. The attachment portion 33 includes a rectangular frame-shaped base portion 34 and a rectangular annular projection 35. The base portion 34 is stacked on and joined to the peripheral edge portion of the rear surface of the plate-shaped portion 32. The projection 35 protrudes rearward from the inner edge of the base portion 34. The attachment portion 33 is made of a PC plastic, an acrylonitrile-butadiene-styrene (ABS) copolymer plastic, an acrylonitrile-ethylene-styrene (AES) copolymer plastic, an acrylonitrile-styrene-acrylate (ASA) copolymer plastic, or the like. Also, the attachment portion 33 may be made of a polymer alloy in which a PC plastic is mixed with an ABS plastic, an AES plastic, an ASA plastic, or the like.

The seal member 40 includes a foam seal portion 41. The foam seal portion 41 is formed by foaming an elastic material such as a urethane plastic, or ethylene propylene diene rubber (EPDM), or the like. The foam seal portion 41 is attached to the projection 35 by being engaged with an engagement portion (not shown) provided on the projection 35, for example. As shown in FIG. 4, in a state in which the sensor device 25 is attached to the body 11 and the electromagnetic wave transmissive cover 30 is attached to the front grille 12, the foam seal portion 41 is in contact with the sensor device 25 in an elastically deformed state.

FIGS. 7 and 8 illustrate a state in which the sensor device 25 is yet to be attached to the body 11 and the electromagnetic wave transmissive cover 30 is yet to be attached to the front grille 12. At this stage, the foam seal portion 41 is separated from the sensor device 25 and is not elastically deformed.

Further, in the first embodiment, the projection 35, which has a rectangular annular shape, includes connection holes 36 as shown in FIG. 6. The connection holes 36 are located at opposite end portions in the left-right direction and connect the inside and the outside of the region surrounded by the projection 35. Each connection hole 36 extends in the left-right direction and is open in the inner surface and the outer surface of the projection 35. Pieces of air permeable adhesive tape 37 are provided on at least one of the inner surface and the outer surface of the projection 35 to close the openings of the connecting holes 36. The air permeable adhesive tape 37 allows air and water vapor to pass therethrough but prevents water from passing therethrough.

Operation of the first embodiment, which is configured as described above, will now be described.

As shown in FIGS. 4 to 6, the clearance G1 is formed between the sensor device 25 attached to the body 11 and the cover body 31 attached to the front grille 12. In the clearance G1, the seal member 40 is disposed at a position surrounding the electromagnetic wave transmissive portion 26*a*. The seal member 40 includes the foam seal portion 41, which is formed by foaming an elastic material. The foam seal portion 41 is attached to the cover body 31. The foam seal portion 41 is in contact with the front surface of the sensor device 25 while surrounding the electromagnetic wave transmissive portion 26*a*. The foam seal portion 41 is soft and has restorability. Therefore, the foam seal portion 41 is deformed in accordance with the outer shape of the sensor device 25, thereby coming into close contact with the sensor device 25. The seal member 40 prevents water and debris from entering a region in the clearance G1 that is surrounded by the seal member 40.

In addition, the foam seal portion 41, which has a cellular structure, has a cushioning property. For example, when an impact is applied to the electromagnetic wave transmissive cover 30 from the front due to a collision or the like of the land vehicle 10, at least some of the impact is absorbed by the foam seal portion 41. The impact transmitted to the sensor device 25 is reduced by the amount of the impact absorbed by the foam seal portion 41. This prevents the impact transmitted to the sensor device 25 from displacing the mounting position of the sensor device 25 from the mounting position before the impact was applied.

When the region of the clearance G1 surrounded by the seal member 40 is humid, water vapor (moisture) passes through the connection holes 36 and the air permeable adhesive tape 37 to be discharged to the outside of the region. In addition, even if the sensor module 20 is splashed with muddy water while the land vehicle 10 is traveling or even if the sensor module 20 is splashed with washing water while the land vehicle 10 is being washed, the air permeable adhesive tape 37 prevents the washing water, the muddy water, or the like from entering the region.

The first embodiment has the following advantages.

(1-1) As shown in FIG. 2, the seal member 40 according to the first embodiment includes the foam seal portion 41, which is formed by foaming an elastic material. The seal member 40 is disposed between the sensor device 25 and the cover body 31. The seal member 40 is attached to the cover body 31. The foam seal portion 41, which is part of the seal member 40, is in contact with the front surface of the sensor device 25 while surrounding the electromagnetic wave transmissive portion 26*a*.

Therefore, the clearance G1 (FIGS. 4 to 6) is sealed by the seal member 40. This prevents water and debris from collecting on the electromagnetic wave transmissive portion 26*a* and thus prevents the detection performance of the sensor device 25 from deteriorating due to collected water and debris.

(1-2) When an impact is applied to the electromagnetic wave transmissive cover 30 according to the first embodiment from the front, the cushioning property of the foam seal portion 41 prevents the mounting position of the sensor device 25 from being displaced. This prevents the detection performance of the sensor device 25 from being reduced due to displacement of the mounting position.

(1-3) In the first embodiment, the connection holes 36 are formed in the projection 35, and the opening of each connection hole 36 is closed by the air permeable adhesive tape 37 as shown in FIG. 6. This prevents the humidity in the region surrounded by the seal member 40 from increasing, and thus prevents the electromagnetic wave transmissive portion 26*a* and the plate-shaped portion 32 from becoming fogged. Also, the air permeable adhesive tape 37 prevents muddy water or washing water from entering the region through the connection holes 36.

Second Embodiment

A sensor module 20 for a land vehicle 10 according to a second embodiment will now be described with reference to FIGS. 9 to 11.

Although not described in the first embodiment, the sensor device 25 is configured such that its orientation is adjustable. Such adjustment is performed by rotating the sensor device 25 around at least one of a first axis L1 and a second axis L2, which extend along a plane orthogonal to the emission direction and are orthogonal to each other, as shown in FIG. 9. The front surface of the plate-shaped portion 32 is assumed to be orthogonal to the emission direction, and the first axis L1 and the second axis L2 are illustrated on this surface for illustrative purposes.

The adjustment of the orientation is performed to allow the sensor device 25, which emits and receives electromagnetic waves, to operate properly, and is generally referred to as aiming. The aiming is performed, for example, when the sensor device 25 is installed, when the vehicle 10 is maintained, when the sensor device 25 is inspected, or when the detection accuracy of the sensor device 25 is reduced.

In the second embodiment, an imaginary line extending in the left-right direction is the first axis L1, and an imaginary line extending in the vertical direction is the second axis L2. By rotating the sensor device 25 in both forward and reverse directions about the first axis L1 with reference to the front surface, the orientation of the sensor device 25 can be adjusted in each direction by about 2° at the maximum. Also, by rotating the sensor device 25 in both forward and reverse directions about the second axis L2 with reference to the front surface, the orientation of the sensor device 25 can be adjusted in each direction by about 2° at the maximum.

The foam seal portion 41 includes two first band portions 42 and two second band portions 44. The two first band portions 42 extend in a direction along the first axis L1 while being disposed on opposite sides of the electromagnetic wave transmissive portion 26*a*. In the second embodiment, the two first band portions 42 extend in the left-right direction in a state of being parallel to each other. The two second band portions 44 extend in a direction along the second axis L2 while being disposed on opposite sides of the electromagnetic wave transmissive portion 26*a*. In the second embodiment, the two second band portions 44 extend in the in the vertical direction in a state of being parallel to each other. The opposite end portions of each second band portion 44 are connected to the nearest end portions of the first band portions 42. Each first band portion 42 and each second band portion 44, which are adjacent to each other, are coupled to each other at a coupling portion 46. In other words, the two first band portions 42 and the two second band portions 44 are coupled to each other at the coupling portions 46. The foam seal portion 41 is formed by the first band portions 42 and the second band portions 44 as a rectangular annular shape that is more elongated in the left-right direction than in the vertical direction. The foam seal portion 41 includes the coupling portions 46 at four corners.

Figure 10:
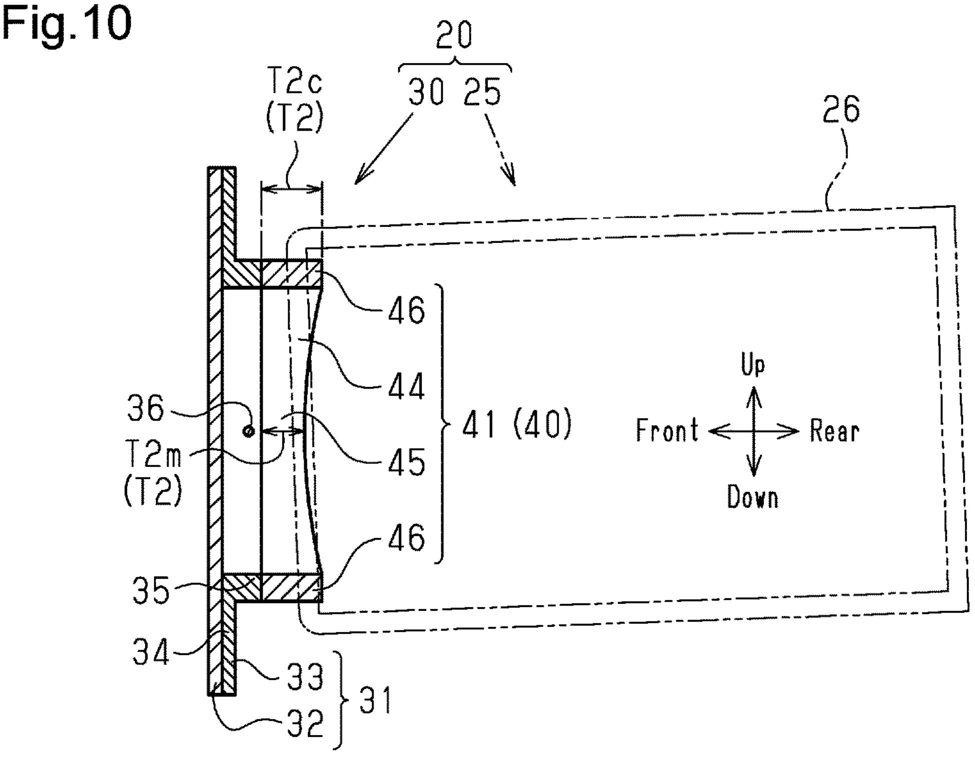
FIG. 10 is a cross-sectional side view showing an electromagnetic wave transmissive cover according to the second embodiment together with a sensor device.
Figure 11:
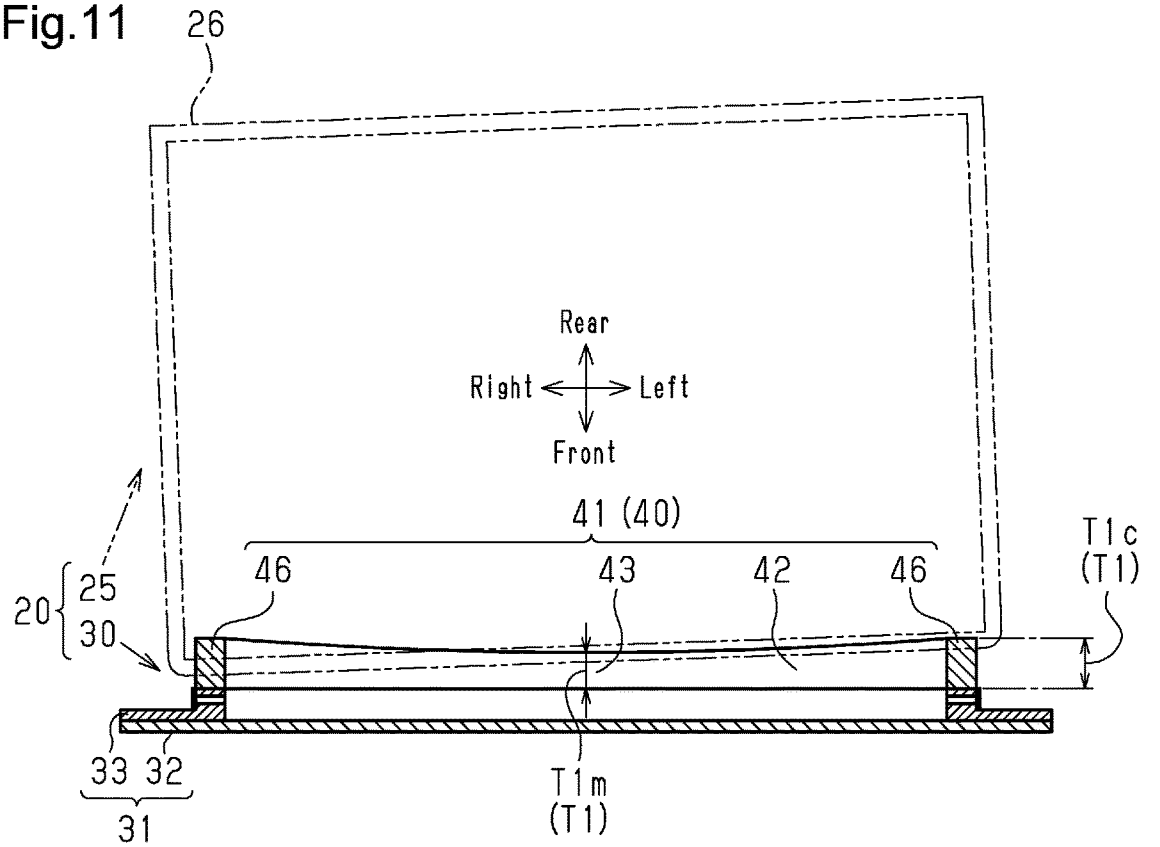
FIG. 11 is a cross-sectional plan view showing the electromagnetic wave transmissive cover according to the second embodiment together with the sensor device.
Figure 12:
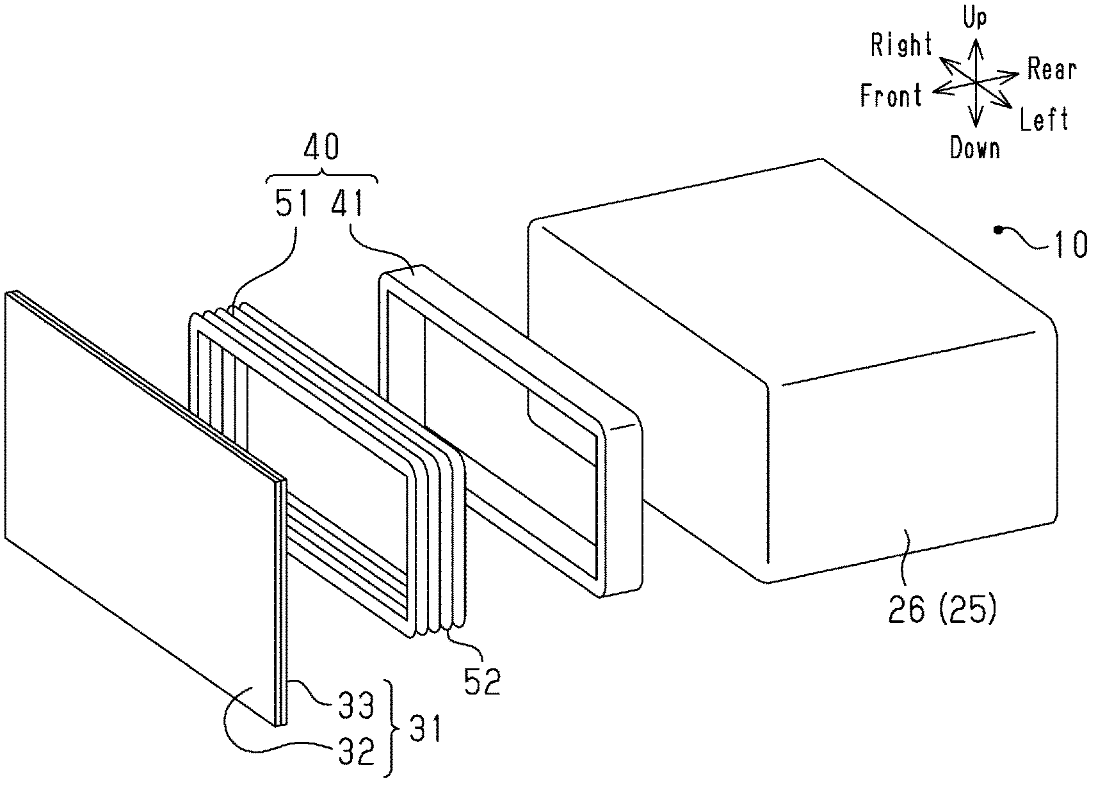
FIG. 12 is an exploded perspective view of a sensor module according to a third embodiment.

As shown in FIG. 11, the dimension of each first band portion 42 in the front-rear direction is referred to as thicknesses T1. As shown in FIG. 10, the dimension of each second band portion 44 in the front-rear direction is referred to as thicknesses T2.

As shown in FIGS. 11, the thickness T1 of each first band portion 42 is set to be larger at the coupling portions 46, at which the first band portion 42 is coupled to the adjacent second band portions 44, than at a central portion 43 of the first band portion 42 in the direction along the first axis L1 (the left-right direction). In the second embodiment, the thickness T1 of each first band portion 42 is set to be at a minimum at the central portion 43 and to gradually increase toward the coupling portions 46.

When the sensor device 25 is rotated about the second axis L2, the separation between the sensor device 25 and each first band portion 42 decreases at one end portion and increases at the other end portion in the direction along the first axis L1 (the left-right direction). To bring each first band portion 42 into contact with the sensor device 25 even at a position where the separation is the largest, it is preferable that a thickness T1*c* at each coupling portion 46 be greater than or equal to 120% of a thickness T1*m* at the central portion 43. However, if the thickness T1*c* is excessively large with respect to the thickness T1*m*, the first band portion 42 is excessively compressed by the sensor device 25 at a location where the separation is relatively small. Accordingly, a relatively large reaction force acts on the sensor device 25. Therefore, there is a limit to an increase in the thickness T1*c*.

Also, as shown in FIG. 10, the thickness T2 of each second band portion 44 is set to be larger at the coupling portions 46, at which the second band portion 44 is coupled to the adjacent first band portions 42, than at a central portion 45 of the second band portion 44 in the direction along the second axis L2 (the vertical direction). In the second embodiment, the thickness T2 of each second band portion 44 is set to be at a minimum at the central portion 45 and to gradually increase toward the coupling portions 46.

When the sensor device 25 is rotated about the first axis L1, the separation between the sensor device 25 and each second band portion 44 decreases at one end portion and increases at the other end portion in the direction along the second axis L2 (the vertical direction). To bring each second band portion 44 into contact with the sensor device 25 even at a position where the separation is the largest, it is preferable that a thickness T2*c* at each coupling portion 46 be greater than or equal to 120% of a thickness T2*m* at the central portion 45. However, if the thickness T2*c* is excessively large with respect to the thickness T2*m*, the second band portion 44 is excessively compressed by the sensor device 25 at a location where the separation is relatively small. Accordingly, a relatively large reaction force acts on the sensor device 25. Therefore, there is a limit to an increase in the thickness T2*c*.

The configuration, other than the above, is the same as the first embodiment. Thus, in the second embodiment, the same components as those in the first embodiment are given the same reference numerals, and detailed explanations are omitted.

Operation of the second embodiment will now be described.

When the sensor device 25 is rotated about the second axis L2 during the above-described aiming, the separation between the sensor device 25 and the cover body 31 becomes larger at one end portion of the sensor device 25 in the direction along the first axis L1 (left-right direction) than at the central portion 43. The separation is smaller at the other end portion of the sensor device 25 than at the central portion 43 (see FIG. 11).

In this regard, in the second embodiment, the thickness T1 of each first band portion 42 is larger at the coupling portions 46, at which the first band portion 42 is coupled to the adjacent second band portions 44, than at the central portion 43 of the first band portion 42 in the direction along the first axis L1. Therefore, the coupling portions 46 of each first band portion 42 come into contact with the sensor device 25 without a gap.

Particularly, rotation of the sensor device 25 about the second axis L2 causes the separation to gradually increase or gradually decrease as the distance from the central portion 43 of the sensor device 25 in the direction along the first axis L1 increases.

In this regard, in the second embodiment, the thickness T1 of each first band portion 42 gradually increases or gradually decreases toward each coupling portion 46 at which the first band portion 42 is coupled to the adjacent second band portion 44. This allows the entire first band portion 42 to uniformly come into contact with the sensor device 25 at any position in the direction along the first axis L1.

Also, when the sensor device 25 is rotated about the first axis L1 during the above-described aiming, the separation between the sensor device 25 and the cover body 31 becomes larger at one end portion of the sensor device 25 in the direction along the second axis L2 (vertical direction) than at the central portion 45. The separation is smaller at the other end portion of the sensor device 25 than at the central portion 45 (see FIG. 10).

In this regard, in the second embodiment, the thickness T2 of each second band portion 44 is larger at the coupling portions 46, at which the second band portion 44 is coupled to the adjacent first band portions 42, than at the central portion 45 of the second band portion 44 in the direction along the second axis L2. Therefore, the coupling portions 46 of each second band portion 44 come into contact with the sensor device 25 without a gap.

Particularly, rotation of the sensor device 25 about the first axis L1 causes the separation to gradually increase or gradually decrease as the distance from the central portion 43 of the sensor device 25 in the direction along the second axis L2 increases.

In this regard, in the second embodiment, the thickness T2 of each second band portion 44 gradually increases or gradually decreases toward each coupling portion 46 at which the second band portion 44 is coupled to the adjacent first band portion 42. This allows the entire second band portion 44 to uniformly come into contact with the sensor device 25 at any position in the direction along the second axis L2.

Thus, the second embodiment achieves the following advantages in addition to the advantages of the items (1-1) to (1-3) in the first embodiment.

(2-1) In the second embodiment, the thickness T1 of each first band portion 42 is larger at the coupling portions 46 than at the central portion 43 (see FIG. 11). The thickness T2 of each second band portion 44 is larger at the coupling portions 46 than at the central portion 45 (see FIG. 10). Therefore, even when the sensor device 25 is rotated about at least one of the first axis L1 and the second axis L2, the coupling portion 46 located at a position where the separation between the sensor device 25 and the cover body 31 is maximized can be brought into contact with the sensor device 25. Such contact prevents water and debris from entering the region in the clearance G1 that is surrounded by the foam seal portion 41. This prevents water and debris from collecting on the electromagnetic wave transmissive portion 26*a* and thus prevents the detection performance of the sensor device 25 from deteriorating due to collected water and debris.

(2-2) In the second embodiment, the thickness T1 of each first band portion 42 is at a minimum at the central portion 43 and gradually increases from the central portion 43 toward each coupling portion 46 (see FIG. 11). The thickness T2 of each second band portion 44 is at a minimum at the central portion 45 and gradually increases from the central portion 45 toward each coupling portion 46 (see FIG. 10). Therefore, even when the sensor device 25 is rotated about at least one of the first axis L1 and the second axis L2, the entirety of each first band portion 42 and the entirety of each second band portion 44 can be brought into contact with the sensor device 25. This improves sealing performance of preventing water and debris from entering the region in the clearance G1 that is surrounded by the foam seal portion 41. This prevents water and debris from collecting on the electromagnetic wave transmissive portion 26*a* and thus prevents the detection performance of the sensor device 25 from deteriorating due to collected water and debris.

Third Embodiment

A sensor module 20 for a land vehicle according to a third embodiment will now be described with reference to FIGS. 12 to 15.

The third embodiment is different from the first embodiment, in which the seal member 40 includes only the foam seal portion 41, in that the seal member 40 includes a foam seal portion 41 and an auxiliary seal portion 51. The third embodiment is the same as the first embodiment in that the cover body 31 is an attachment object, and the sensor device 25 is a contact object.

The auxiliary seal portion 51 is disposed between the cover body 31 and the foam seal portion 41. The auxiliary seal portion 51 has a rectangular annular shape of a size capable of surrounding the electromagnetic wave transmissive portion 26*a*. The auxiliary seal portion 51 includes a shape-changing portion 52 in at least a part thereof. The shape-changing portion 52 has the shape of an accordion, in which parts folded to project outward and parts folded to be recessed inward are arranged alternately in the front-rear direction. In the third embodiment, the entire auxiliary seal portion 51 is formed by the shape-changing portion 52.

The auxiliary seal portion 51 is preferably made of, for example, a thermoplastic elastomer (TPE). The cover body 31 and the auxiliary seal portion 51 are formed by a plastic molding method such as a two-color molding method. In a case in which the cover body 31 is made of a PC plastic, the auxiliary seal portion 51 is preferably made of, for example, a thermoplastic copolyester (TPC) from the viewpoint of forming the auxiliary seal portion 51 in a state of being in close contact with the cover body 31.

When the auxiliary seal portion 51 is formed separately from the cover body 31 by a plastic molding method such as an extrusion molding method, the auxiliary seal portion 51 may be attached to, for example, the projection 35 of the cover body 31 with a double-sided adhesive tape, an adhesive, or the like. The auxiliary seal portion 51 may be attached to the foam seal portion 41 with a double-sided adhesive tape, an adhesive, or the like. In this manner, the auxiliary seal portion 51 is joined to the cover body 31 and the foam seal portion 41. The foam seal portion 41 is indirectly attached to the cover body 31, which is an attachment object, with the auxiliary seal portion 51.

The configuration, other than the above, is the same as the first embodiment. Thus, in the third embodiment, the same components as those in the first embodiment are given the same reference numerals, and detailed explanations are omitted.

Operation of the third embodiment will now be described.

Figure 14:
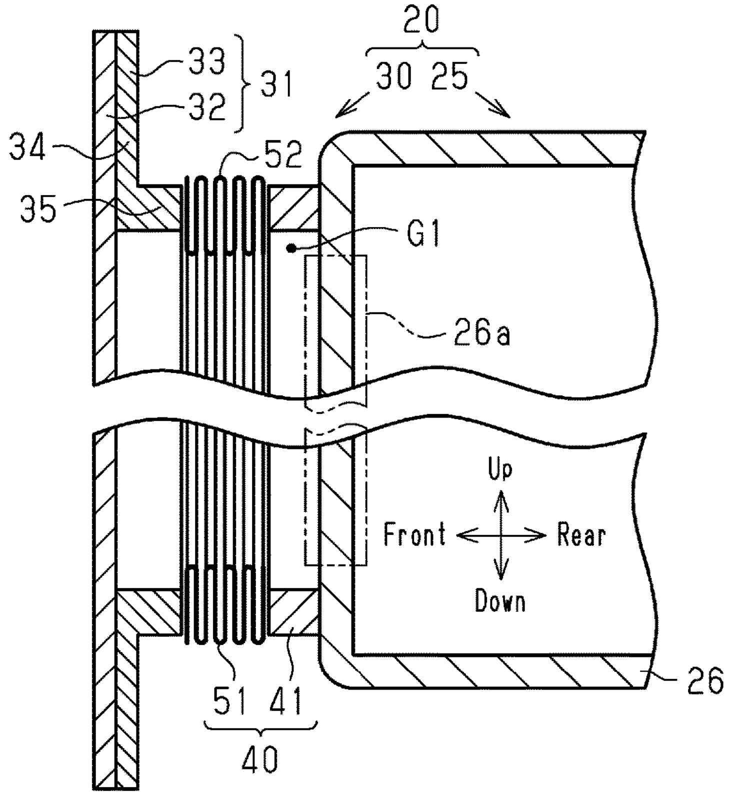
FIG. 14 is a partial cross-sectional side view taken along line 14-14 of FIG. 13.
Figure 15:
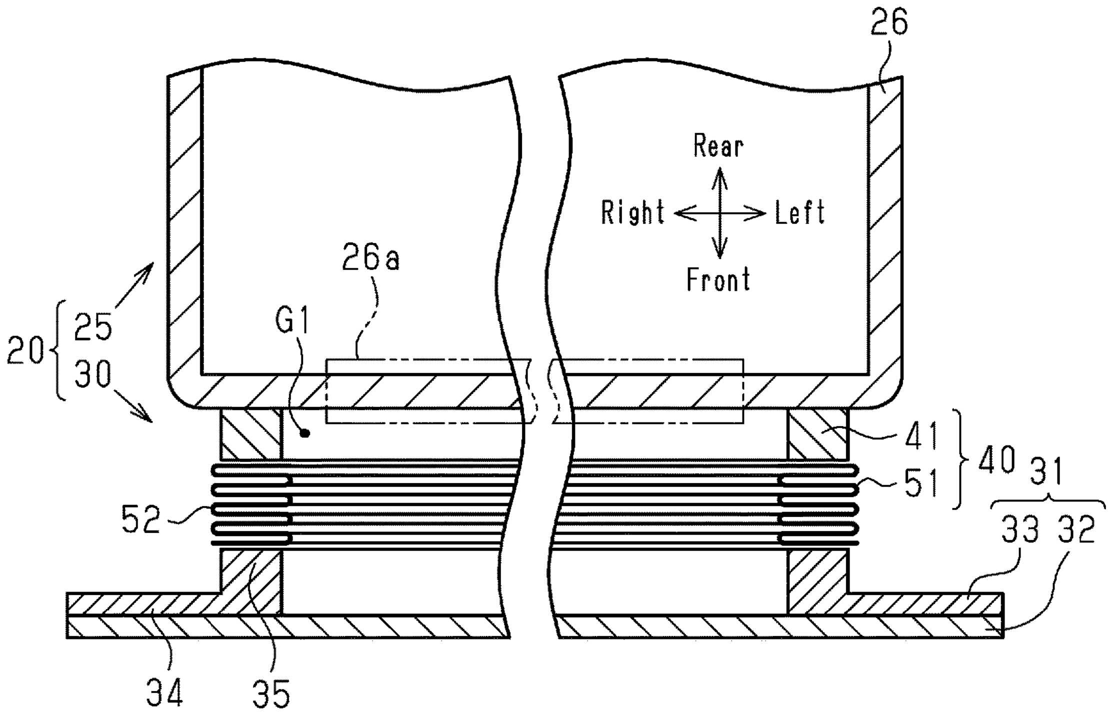
FIG. 15 is a partial cross-sectional plan view taken along line 15-15 of FIG. 13.

When the seal member 40 is disposed in the clearance G1 between the sensor device 25 and the cover body 31, the foam seal portion 41 is located in a part of the clearance G1 that is closer to the sensor device 25, and the auxiliary seal portion 51 is located in a part of the clearance G1 that is closer to the cover body 31, as shown in FIGS. 14 and 15. The foam seal portion 41 is in contact with the front surface of the sensor device 25. The auxiliary seal portion 51 is joined to the cover body 31 and the foam seal portion 41.

In addition to deformation of the foam seal portion 41 in accordance with the outer shape of the sensor device 25, the accordion-folded shape-changing portion 52 of the auxiliary seal portion 51 changes its shape by expansion and contraction.

Further, in addition to the foam seal portion 41, the shape-changing portion 52 also has a cushioning property. Therefore, the cushioning property of the seal member 40 is higher than that in the case in which the seal member 40 includes only the foam seal portion 41.

Thus, when an impact is applied to the electromagnetic wave transmissive cover 30 from the front due to a collision or the like of the land vehicle 10, at least some of the impact is absorbed by the shape-changing portion 52 as well as by the foam seal portion 41. The impact transmitted to the sensor device 25 is reduced by the amount of the impact absorbed by the shape-changing portion 52. This prevents the impact transmitted to the sensor device 25 from displacing the mounting position of the sensor device 25 from the mounting position before the impact was applied.

Figure 13:
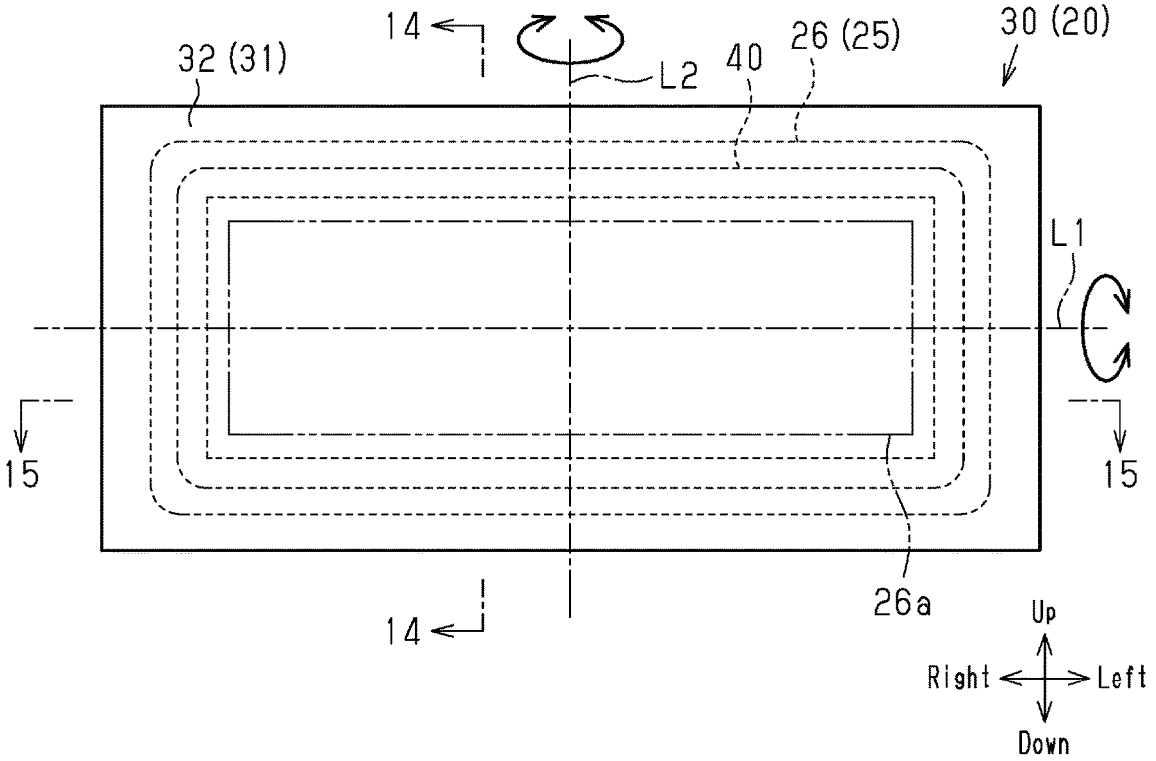
FIG. 13 is a front view of the sensor module according to the third embodiment.

When the sensor device 25 is rotated about at least one of the first axis L1 and the second axis L2 shown in FIG. 13 during aiming, the accordion-folded shape-changing portion 52 changes its shape by expanding and contracting to adapt to the adjustment of the orientation of the sensor device 25.

Thus, the third embodiment achieves the following advantages in addition to the advantages of the items (1-1) to (1-3) in the first embodiment.

(3-1) In the third embodiment, as shown in FIGS. 14 and 15, the auxiliary seal portion 51, which includes the accordion-folded shape-changing portion 52, is disposed between the cover body 31 and the foam seal portion 41. The foam seal portion 41 and the auxiliary seal portion 51 form the seal member 40.

Thus, as compared with a case in which the seal member 40 includes only the foam seal portion 41, the foam seal portion 41 is brought into closer contact with the sensor device 25.

In addition, when an impact is applied to the electromagnetic wave transmissive cover 30 from the front, the cushioning property of the seal member 40 is enhanced. The mounting position of the sensor device 25 is prevented from being displaced. This prevents the detection performance of the sensor device 25 from being reduced due to displacement of the mounting position.

In addition, even when aiming is performed on the sensor device 25, the foam seal portion 41 is brought into close contact with the sensor device 25. This improves sealing performance of preventing water and debris from entering the region in the clearance G1 that is surrounded by the foam seal portion 41 through the space between the foam seal portion 41 and the sensor device 25. Therefore, even when aiming is performed, water and debris are prevented from collecting on the electromagnetic wave transmissive portion 26*a* in the above region.

(3-2) In the third embodiment, the seal member 40 is formed by the foam seal portion 41 and the auxiliary seal portion 51 as described above. Therefore, the rectangular annular region in the clearance G1 that surrounds the electromagnetic wave transmissive portion 26*a* is filled with the seal member 40 and sealed even when the clearance G1 is relatively large.

The above-described embodiments may be modified as follows. The above-described embodiments and the following modifications can be combined as long as the combined modifications remain technically consistent with each other.

<Modification to Foam Seal Portion 41>

Figure 9:
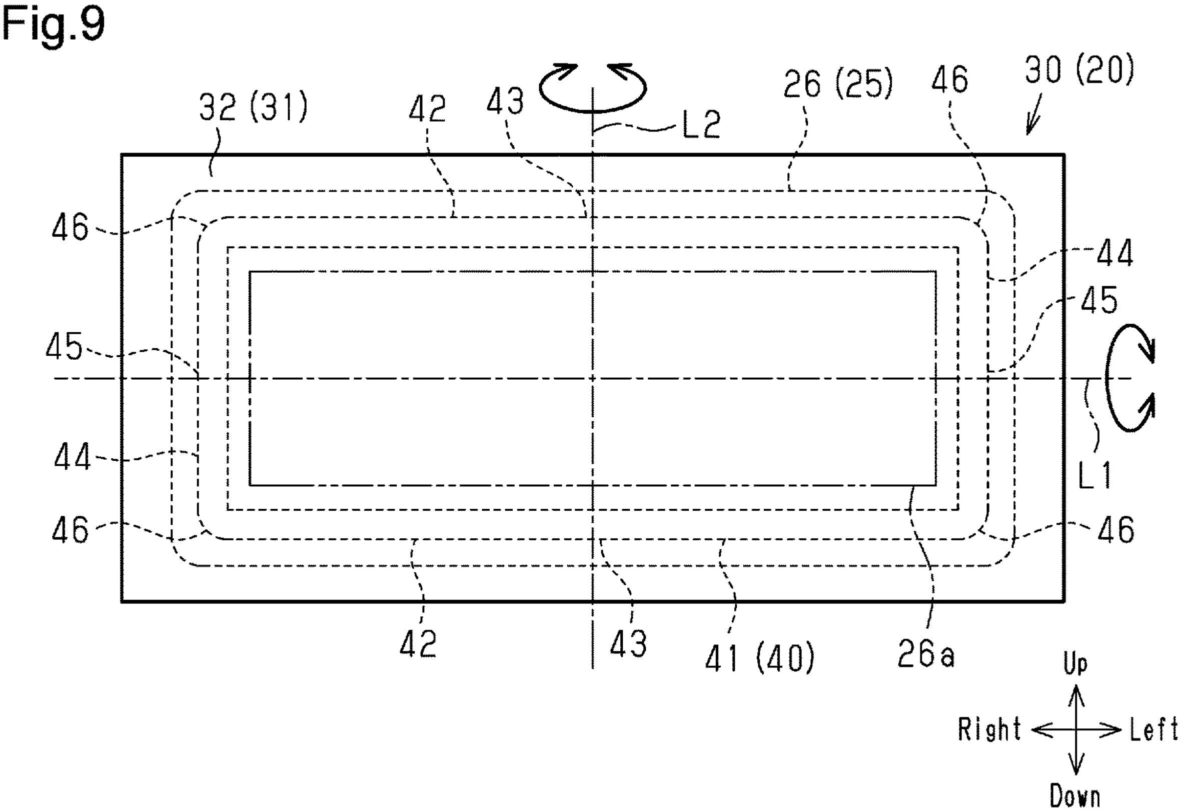
FIG. 9 is a front view of a sensor module according to a second embodiment.

In FIG. 9, the first band portions 42 of the foam seal portion 41 may extend in a direction obliquely intersecting with the first axis L1 on condition that the first band portions 42 extend in a direction along the first axis L1. Likewise, the second band portions 44 of the foam seal portion 41 may extend in a direction obliquely intersecting with the second axis L2 on condition that the second band portions 44 extend in a direction along the second axis L2.

Figure 16:
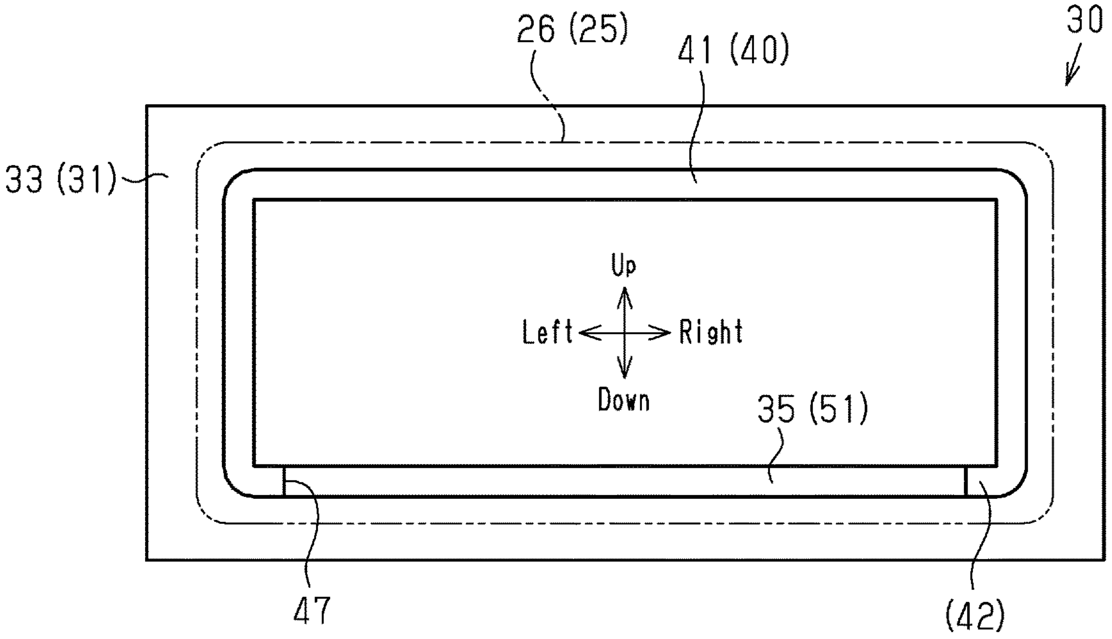
FIG. 16 is a rear view of an electromagnetic wave transmissive cover according to a modification of the first embodiment.

As shown in FIG. 16, as a modification of each of the first to third embodiments, a cutout 47 may be provided in a large part of a lower portion (in the second embodiment, the first band portion 42 on the lower side) of the foam seal portion 41. With this modification, even if water enters the region surrounded by the seal member 40 in the clearance G1 between the cover body 31 and the sensor device 25, the water is discharged from the cutout 47 under its own weight. This configuration also prevents the electromagnetic wave transmissive portion 26*a*, which faces the region, and the plate-shaped portion 32 from being fogged. In this case, the connection holes 36 and the air permeable adhesive tape 37 can be omitted.

Figure 17:
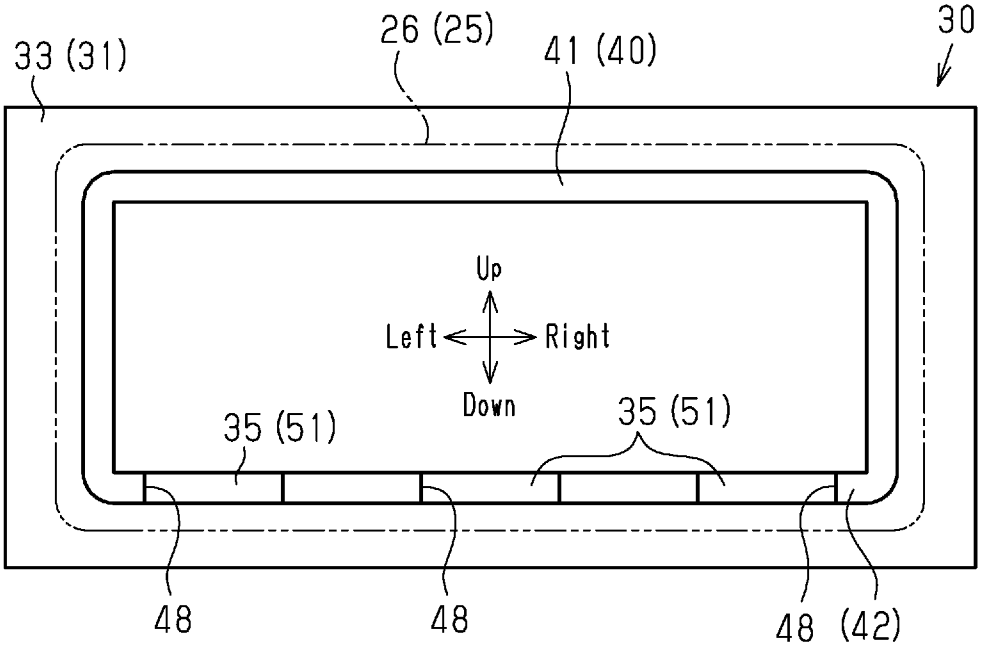
FIG. 17 is a rear view of an electromagnetic wave transmissive cover according to a modification of the first embodiment.

Further, as shown in FIG. 17, as a modification of each of the first to third embodiments, cutouts 48, which are smaller than the above-described cutout 47, may be provided at one or more positions in the lower portion (in the second embodiment, the first band portion 42 on the lower side) of the foam seal portion 41. This modification also allows the entered water to be discharged from the cutouts 48 under its own weight. This modification also prevents the electromagnetic wave transmissive portion 26*a* and the plate-shaped portion 32 from being fogged. In this case also, the connection holes 36 and the air permeable adhesive tape 37 can be omitted.

Figure 18:
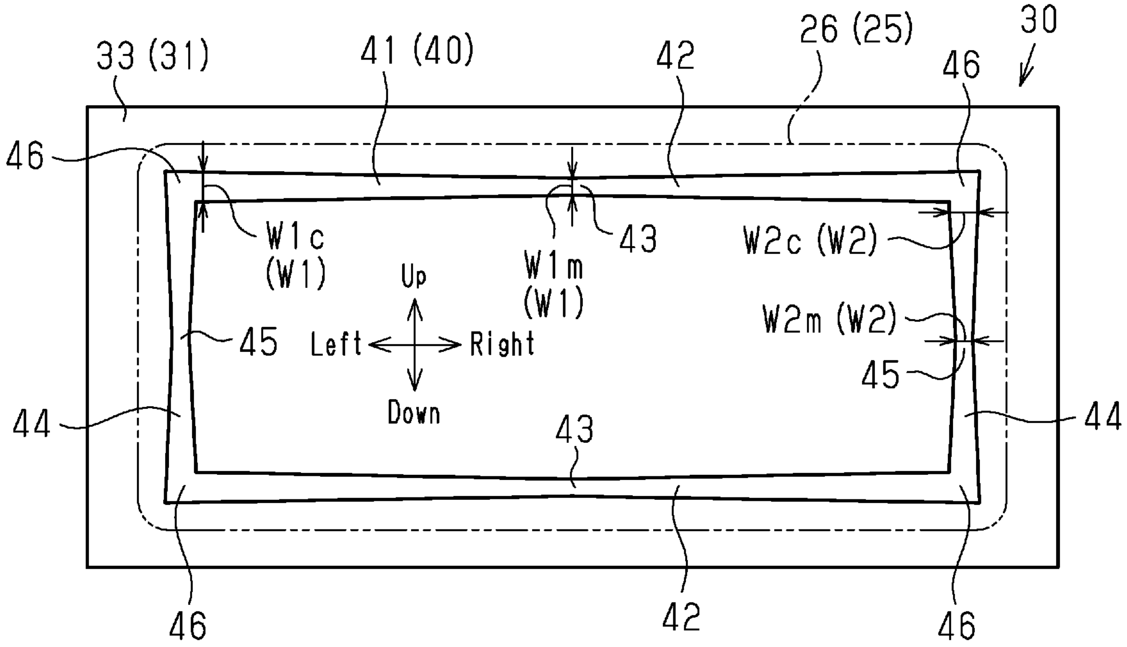
FIG. 18 is a rear view of an electromagnetic wave transmissive cover according to a modification of the second embodiment.
Figure 19:
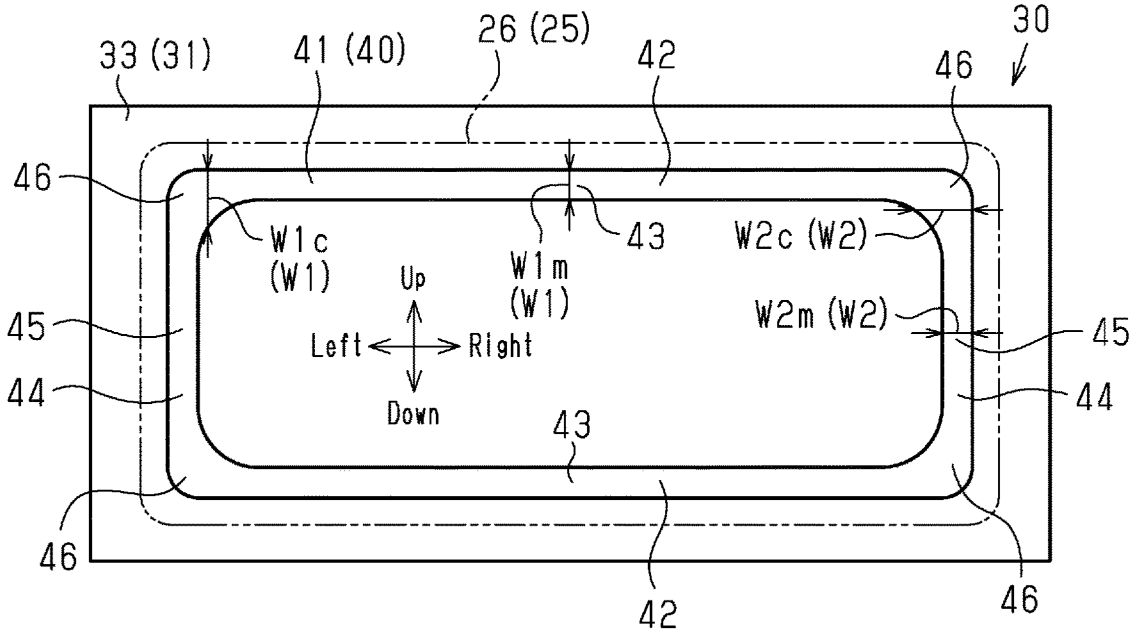
FIG. 19 is a rear view of an electromagnetic wave transmissive cover according to a modification of the second embodiment.

As shown in FIGS. 18 and 19, the dimension of each first band portion 42 in the vertical direction will now be referred to as width W1, and the dimension of each second band portion 44 in the left-right direction will now be referred to as width W2.

As a modification of the second embodiment, the width W1 of each first band portion 42 may be larger at the coupling portions 46, at which the first band portion 42 is coupled to the adjacent second band portions 44, than at the central portion 43 of the first band portion 42 in the direction along the first axis L1 (the left-right direction), as shown in FIGS. 18 and 19. Particularly, as in the modification shown in FIG. 18, the width W1 of each first band portion 42 may be at a minimum at the central portion 43 and gradually increase toward the coupling portions 46.

As described above, when the sensor device 25 is rotated about the second axis L2, the separation between the sensor device 25 and each first band portion 42 decreases at one end portion and increases at the other end portion in the direction along the first axis L1. To bring each first band portion 42 into contact with the sensor device 25 even at a position where the separation is the largest, it is preferable that a width $W1c$ at each coupling portion 46 be greater than or equal to 120% of a width $W1m$ at the central portion 43. However, if the width $W1c$ is excessively large with respect to the width $W1m$, the first band portion 42 is excessively compressed by the sensor device 25 at a location where the separation is relatively small. Accordingly, a relatively large reaction force acts on the sensor device 25. Therefore, there is a limit to an increase in the width W1*c*.

Also, as shown in FIGS. 18 and 19, the width W2 of each second band portion 44 may be larger at the coupling portions 46, at which the second band portion 44 is coupled to the adjacent first band portions 42, than at a central portion 45 of the second band portion 44 in the direction along the second axis L2 (the vertical direction). Particularly, as in the modification shown in FIG. 18, the width W2 of each second band portion 44 may be at a minimum at the central portion 45 and gradually increase toward the coupling portions 46.

As described above, when the sensor device 25 is rotated about the first axis L1, the separation between the sensor device 25 and each second band portion 44 decreases at one end portion and increases at the other end portion in the direction along the second axis L2. To bring each second band portion 44 into contact with the sensor device 25 even at a position where the separation is the largest, it is preferable that a width W2*c* at each coupling portion 46 be greater than or equal to 120% of a width W2*m* at the central portion 45. However, if the width W2*c* is excessively large with respect to the width W2*m*, the second band portion 44 is excessively compressed at a location where the separation is relatively small. Accordingly, a relatively large reaction force acts on the sensor device 25. Therefore, there is a limit to an increase in the width W2*c*.

Either of the modifications shown in FIGS. 18 and 19 has the same advantages as those of the second embodiment.

The width W1 of each first band portion 42 is set to be larger at the coupling portions 46 than at the central portion 43. In other words, in each first band portion 42, the area that can contact the sensor device 25 is larger in the coupling portions 46 than in the central portion 43. Therefore, even when the sensor device 25 is rotated about the second axis L2, the coupling portions 46 of each first band portion 42 are brought into contact with the sensor device 25.

Also, the width W2 of each second band portion 44 is set to be larger at the coupling portions 46 than at the central portion 45. In other words, in each second band portion 44, the area that can contact the sensor device 25 is larger in the coupling portions 46 than in the central portion 45. Therefore, even when the sensor device 25 is rotated about the first axis L1, the coupling portions 46 of each second band portion 44 are brought into contact with the sensor device 25.

Particularly, in the modification of FIG. 18, the width W1 of each first band portion 42 gradually increases from the central portion 43 toward the coupling portions 46. Therefore, even when the sensor device 25 is rotated about the second axis L2, the entirety of each first band portion 42 can be brought into uniform contact with the sensor device 25 at any position in the direction along the first axis L1. The width W2 of each second band portion 44 gradually increases from the central portion 45 toward the coupling portions 46. Therefore, even when the sensor device 25 is rotated about the first axis L1, the entirety of each second band portion 44 can be brought into uniform contact with the sensor device 25 at any position in the direction along the second axis L2.

Although not illustrated, both of the width W1 and the thickness T1 of each first band portion 42 may be larger at the coupling portions 46 than at the central portion 43, and both or one of the width W2 and the thickness T2 of each second band portion 44 may be larger at the coupling portions 46 than at the central portion 45.

Also, although not illustrated, both or one of the width W1 and the thickness T1 of each first band portion 42 may be larger at the coupling portions 46 than at the central portion 43, and both of the width W2 and the thickness T2 of each second band portion 44 may be larger at the coupling portions 46 than at the central portion 45.

In any of the above cases, it is preferable that the thickness T1*c* at each coupling portion 46 be greater than or equal to 120% of the thickness T1*m* at the central portion 43. It is preferable that the thickness T2*c* at each coupling portion 46 be greater than or equal to 120% of the thickness T2*m* at the central portion 45.

Also, it is preferable that the width W1*c* at each coupling portion 46 be greater than or equal to 120% of the width W1*m* at the central portion 43. It is preferable that the width W2*c* at each coupling portion 46 be greater than or equal to 120% of the width W2*m* at the central portion 45.

These modifications achieve the same advantages as the advantages of the second embodiment, the modification of FIG. 18, and the modification of FIG. 19.

That is, even when the sensor device 25 is rotated about the second axis L2 or even when the sensor device 25 is rotated about the first axis L1, all the coupling portions 46 are brought into contact with the sensor device 25.

Further, although not illustrated, both or one of the width W1 and the thickness T1 of each first band portion 42 in contact with the sensor device 25 may gradually increase from the central portion 43 toward the coupling portions 46. Also, both or one of the width W2 and the thickness T2 of each second band portion 44 in contact with the sensor device 25 may gradually increase from the central portion 45 toward the coupling portions 46.

These modifications achieve the same advantages as the advantages of the second embodiment, the modification of FIG. 18, and the modification of FIG. 19.

Specifically, even when the sensor device 25 is rotated about the second axis L2, the entirety of each first band portion 42 can be brought into uniform contact with the sensor device 25 at any position in the direction along the first axis L1. Also, even when the sensor device 25 is rotated about the first axis L1, the entirety of each second band portion 44 can be brought into uniform contact with the sensor device 25 at any position in the direction along the second axis L2.

<Attachment Object and Contact Object of Seal Member 40>

One of the cover body 31 and the sensor device 25 may serve as an attachment object to which the seal member 40 is attached, and the other one of the cover body 31 and the sensor device 25 may serve as a contact object with which the seal member 40 is in contact. Therefore, the sensor device 25 may serve as an attachment object, and the cover body 31 may serve as a contact object.

For example, although not illustrated, the foam seal portion 41 may be directly attached to the sensor device 25 in the first and second embodiments, in which the seal member 40 includes only the foam seal portion 41. Further, the foam seal portion 41 may be indirectly attached to the sensor device 25 via another member. The front surface of the foam seal portion 41 may be in contact with the rear surface of the cover body 31, for example, via the projection 35 of the attachment portion 33.

Figure 20:
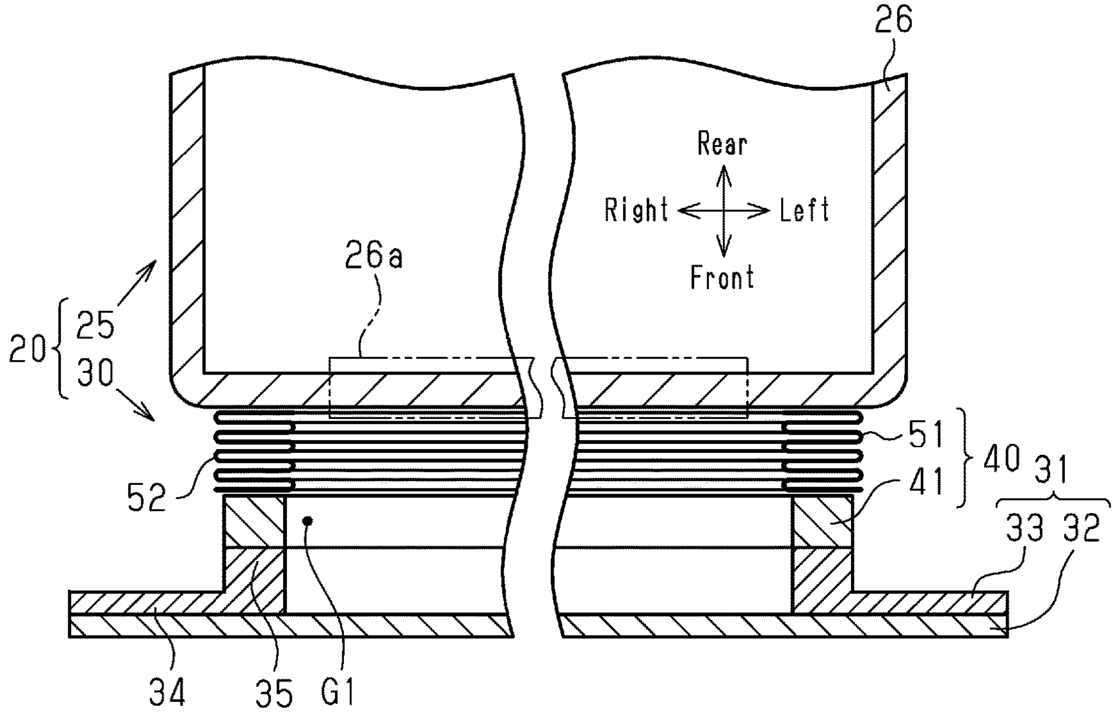
FIG. 20 is a partial cross-sectional plan view corresponding to FIG. 15, illustrating a sensor module according to a modification of the third embodiment.

Further, in the third embodiment, in which the seal member 40 includes the foam seal portion 41 and the auxiliary seal portion 51, the seal member 40 may be disposed in a manner shown in FIG. 20. In the modification shown in FIG. 20, the same components as those in the third embodiment are given the same reference numerals, and detailed explanations are omitted.

In the modification shown in FIG. 20, the auxiliary seal portion 51 is attached to the case 26 of the sensor device 25 while surrounding the electromagnetic wave transmissive portion 26*a*. The foam seal portion 41 is coupled to the auxiliary seal portion 51. In other words, the foam seal portion 41 is indirectly attached to the sensor device 25 with the auxiliary seal portion 51. The foam seal portion 41 is brought into contact with the attachment portion 33 (the projection 35 in FIG. 20) while surrounding the electromagnetic wave transmissive portion 26*a*. In this case, the attachment portion 33 may be omitted, and the foam seal portion 41 may be brought into contact with the plate-shaped portion 32.

In any of the modifications, which respectively correspond to the first to third embodiments, the relationship between the attachment object and the contact object of the seal member 40 is inverse to that in the first to third embodiments. However, any of these modifications and the first to third embodiments all have the seal member 40 disposed in the clearance G1 between the sensor device 25 and the cover body 31 to surround the electromagnetic wave transmissive portion 26*a*. Therefore, the seal member 40 prevents water and debris from entering the region in the clearance G1 that is surrounded by the seal member 40.

Therefore, these modifications have the same advantages as those of the first to third embodiments.

<Modification to Auxiliary Seal Portion 51>

The auxiliary seal portion 51 in the third embodiment and the modification of FIG. 20 may have the accordion-folded shape-changing portion 52 only in a part thereof.

The auxiliary seal portion 51 in the third embodiment may be used as a member forming the seal member 40 together with the foam seal portion 41 in each of the second embodiment and the modifications of FIGS. 16 to 19.

<Modification to Foam Seal Portion 41 and Auxiliary Seal Portion 51>

Of the foam seal portion 41 and the auxiliary seal portion 51, at least the foam seal portion 41 may be formed in an annular shape different from a rectangular annular shape if the annular shape has a size capable of surrounding the electromagnetic wave transmissive portion 26*a*. Examples of the shape include an elliptical ring shape and a circular shape, and also include a polygonal annular shape different from a rectangular shape, such as a triangular shape and a pentagonal shape.

Other Modifications

The attachment locations of the sensor device 25 and the electromagnetic wave transmissive cover 30 to the land vehicle 10 may be changed to locations different from those in the above-described embodiments. For example, the sensor device 25 may be attached to the front grille 12 similarly to the electromagnetic wave transmissive cover 30.

The electromagnetic wave transmissive cover 30 can be employed in any land vehicle 10 on which the sensor device 25 that emits and receives electromagnetic waves for detecting objects outside the land vehicle 10 is mounted. In this case, electromagnetic waves emitted and received by the sensor device 25 include millimeter waves in addition to near-infrared rays. When the electromagnetic waves are millimeter waves, a millimeter wave radar device is the sensor device 25.

The sensor device 25, which emits and receives electromagnetic waves to detect objects outside the land vehicle 10, is not limited to a front monitoring device, but may be a device that monitors the situation behind the land vehicle 10, the situation on the sides of the front part of the land vehicle 10, or the situation on the sides of the rear part of the land vehicle 10. In these cases, the electromagnetic wave transmissive cover 30 is located forward of the sensor device 25 in the emission direction of millimeter waves.

The electromagnetic wave transmissive cover 30 may also serve as a vehicle exterior component such as an emblem, an ornament, or a mark.

The sensor module 20 can also be mounted on a vehicle of a type different from the land vehicle 10, for example, an aircraft or a ship.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic wave transmissive cover configured to be employed in a vehicle to which a sensor device is attached, the sensor device including an electromagnetic wave transmissive portion and being configured to emit and receive electromagnetic waves through the electromagnetic wave transmissive portion, the electromagnetic wave transmissive cover comprising:

a cover body that is configured to be attached to the vehicle and cover the sensor device from a front side in an emission direction of the electromagnetic waves; and a seal member attached to the cover body, the seal member being configured to be disposed between the sensor device and the cover body, wherein the seal member includes a foam seal portion formed by foaming an elastic material, the foam seal portion being configured to be in contact with the sensor device in a state of surrounding the electromagnetic wave transmissive portion, the sensor device is configured to adjust an orientation by being rotated about at least one of a first axis and a second axis, the first axis and the second axis are orthogonal to each other, the foam seal portion includes:

two first band portions that extend in a direction along the first axis while being disposed on opposite sides of the electromagnetic wave transmissive portion; and two second band portions that extend in a direction along the second axis while being disposed on opposite sides of the electromagnetic wave transmissive portion, the two first band portions and the two second band portions are coupled to each other at coupling portions, at least one of a width and a thickness of each of the first band portions is set to be larger at the coupling portion at which the first band portion is coupled to the adjacent one of the second band portions than at a central portion of the first band portion in a direction along the first axis, at least one of a width and a thickness of each of the second band portions is set to be larger at the corresponding coupling portion at which the second band portion is coupled to the adjacent one of the first band portions than at a central portion of the second band portion in a direction along the second axis, and the foam seal portion has a cutout at a position lower than the electromagnetic wave transmissive portion, the cutout being configured to allow water that has entered a region surrounded by the seal member to be discharged to an outside of the region by gravity through the cutout.

2. The electromagnetic wave transmissive cover according to claim 1, wherein the seal member further includes an auxiliary seal portion, the auxiliary seal portion being disposed between the cover body and the foam seal portion and coupled to each of the cover body and the foam seal portion, and at least a part of the auxiliary seal portion includes an accordion-folded shape-changing portion that is configured to change its shape by expanding and contracting to adapt to adjustment of the orientation of the sensor device.

3. The electromagnetic wave transmissive cover according to claim 1, wherein the first axis and the second axis extend along a plane orthogonal to the emission direction.

4. The electromagnetic wave transmissive cover according to claim 1, wherein at least one of the width and the thickness of each of the first band portions in contact with the sensor device is set to gradually increase from the central portion in the direction along the first axis toward the coupling portion at which the first band portion is coupled to the adjacent second band portion, and at least one of the width and the thickness of each of the second band portions in contact with the sensor device is set to gradually increase from the central portion in the direction along the second axis toward the coupling portion at which the second band portion is coupled to the adjacent first band portion.

5. A sensor module, comprising:

a sensor device that is configured to be attached to a vehicle, includes an electromagnetic wave transmissive portion, and is configured to emit and receive electromagnetic waves through the electromagnetic wave transmissive portion;

an electromagnetic wave transmissive cover that is configured to be attached to the vehicle and includes a cover body, the cover body covering the sensor device from a front side in an emission direction of the electromagnetic waves; and a seal member that is disposed between the sensor device and the cover body, wherein one of the cover body and the sensor device serves as an attachment object to which the seal member is attached, and the other one of the cover body and the sensor device serves as a contact object with which the seal member is in contact, the seal member is attached to the attachment object, the seal member includes a foam seal portion that is formed by foaming an elastic material and is in contact with the contact object in a state of surrounding the electromagnetic wave transmissive portion, the sensor device is configured to adjust an orientation by being rotated about at least one of a first axis and a second axis, the first axis and the second axis are orthogonal to each other, the foam seal portion includes:

two first band portions that extend in a direction along the first axis while being disposed on opposite sides of the electromagnetic wave transmissive portion; and two second band portions that extend in a direction along the second axis while being disposed on opposite sides of the electromagnetic wave transmissive portion, the two first band portions and the two second band portions are coupled to each other at coupling portions, at least one of a width and a thickness of each of the first band portions is set to be larger at the coupling portion at which the first band portion is coupled to the adjacent one of the second band portions than at a central portion of the first band portion in a direction along the first axis, at least one of a width and a thickness of each of the second band portions is set to be larger at the corresponding coupling portion at which the second band portion is coupled to the adjacent one of the first band portions than at a central portion of the second band portion in a direction along the second axis, and the foam seal portion has a cutout at a position lower than the electromagnetic wave transmissive portion, the cutout being configured to allow water that has entered a region surrounded by the seal member to be discharged to an outside of the region by gravity through the cutout.

6. The sensor module according to claim 5, wherein the seal member further includes an auxiliary seal portion, the auxiliary seal portion being disposed between the attachment object and the foam seal portion and coupled to each of the attachment object and the foam seal portion, and at least a part of the auxiliary seal portion includes an accordion-folded shape-changing portion that is configured to change its shape by expanding and contracting to adapt to adjustment of the orientation of the sensor device.

7. The sensor module according to claim 5, wherein the first axis and the second axis extend along a plane orthogonal to the emission direction.

8. The sensor module according to claim 5, wherein at least one of the width and the thickness of each of the first band portions in contact with the contact object is set to gradually increase from the central portion in the direction along the first axis toward the coupling portion at which the first band portion is coupled to the adjacent second band portion, and at least one of the width and the thickness of each of the second band portions in contact with the contact object is set to gradually increase from the central portion in the direction along the second axis toward the coupling portion at which the second band portion is coupled to the adjacent first band portion.

* * * * *